No. 868,905. PATENTED OCT. 22, 1907.
I. BESSE.
MEASURING RULE.
APPLICATION FILED JAN. 29, 1904.

WITNESSES
John E. R. Hayes
M. V. Foley

INVENTOR
Irvin Besse

UNITED STATES PATENT OFFICE.

IRVIN BESSE, OF NEWBURYPORT, MASSACHUSETTS.

MEASURING-RULE.

No. 868,905.          Specification of Letters Patent.          Patented Oct. 22, 1907.

Application filed January 29, 1904. Serial No. 191,095.

*To all whom it may concern:*

Be it known that I, IRVIN BESSE, of Newburyport, in the county of Essex and State of Massachusetts, a citizen of the United States, have invented a new and useful Improvement in Measuring-Rules, of which the following is a full, clear, and exact description, reference being had to the accompanying drawings, forming a part of this specification, in explaining its nature.

My invention relates to an improvement in measuring rules.

It consists in associating with the numbers comprising the scale of the rule a series of symbols or designating characters each in itself indicative of direction and which by its suggestion of direction indicates a proper holding of the rule in measuring from a given point, whatever may be the direction in which or from which the measurement is taken.

The essential object of my invention is to prevent the common mistake of measuring from the wrong end of the rule.

My invention can best be seen and its utility best understood by reference to the drawings in which—

Figure 1:
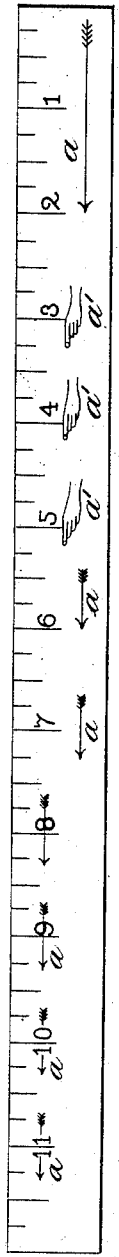

Figure 1 shows in plan a rule provided with the improvement constituting my invention, it being embodied in various symbols or designating characters each in itself indicative of direction and changed in their formation and arrangement for purposes of illustration. Figs. 2, 3, 4 and 5 are plans of an improved rule showing its correct and incorrect positions with respect to measurements taken from the left or right, and being shown especially to illustrate the utility of my invention.

In the drawings:—A represents a rule, and for the purposes of illustration only, divided by marking at regular intervals into twelve divisions and half divisions, each division being supposed to represent one inch and each division being also designated by a number, the numbers running from one to eleven, inclusive, and constituting the scale of the rule. Associated with these numbers of the scale are shown certain symbols or designating characters as arrows $a$, or pointing hands $a^1$, each in itself indicative of direction and for the purpose of indicating by its suggestion of direction a proper holding of the rule in measuring from a given point.
The symbols or arrows preferably point in the direction of measurement or away from the given point from which the measurement is taken, when the rule is held right relatively to such point. I also prefer that the arrow or designating character be associated or combined with each one of the numbers of the scale (as shown in numbers 3 to 11, inclusive, of Fig. 1) and this best by having the arrow or symbol run through the number with which it is combined (see numbers 8 and 9, 10 and 11 of Fig. 1) in order that it may be told by a glance at the number nearest the point from which measurement is taken whether the rule is held right from the way in which the arrow points, so eliminating the necessity of running the eye along the rule to find some indicating character or note the way the scale runs.

The mistake of measuring from the wrong end of the rule is a common one. It would be impossible to explain why the mistake is made. Sometimes it is due to ignorance, more often to carelessness, and then again the most careful measurer may often take an incorrect measurement by measuring from the wrong end of the rule.

It is for the purpose of showing how easy it is for such a mistake to be made as well as to show the utility of my invention in preventing it that I have shown Figs. 2 to 5, inclusive. In these figures there is shown a rule divided into thirty-six equal divisions and half divisions, each division being assumed to read one inch, which numbered in numerical order form the scale of the rule. Assume a measurement is taken from the point $a^2$ on the right to the line $a^3$, $a^4$ coming about midway the rule, (see Fig. 2). With the rule in proper position the measurement would read 19 divisions or inches. Assume now that the rule is turned and a measurement taken from its wrong end. The measurement from the same point to the line would then read 17 inches (see Fig. 3 and note the reading is taken with the numbers of the scale inverted). In the same manner measuring from a point $a^5$ on the left to the line $a^3$, $a^4$ the rule would be reversed and the numbers would accordingly be read upside down, but the true reading as shown would be, if the rule were held right, 17 inches (see Fig. 5), while if the rule were incorrectly held, the measurement taken from the wrong end of the rule would be 19 inches (see Fig. 5). Reference is thus made to measurement taken from the left or right merely because it often happens for various reasons that it becomes necessary to take measurement from the right or left with a rule which is scaled only in one direction. Now in both these cases where the point to which measurement is made comes near the center of the rule there is a very slight discrepancy in the numerical reading whether the rule be held in a right or wrong way but just enough to be most disastrous if a correct reading is desired. Moreover, it is a mistake which can be very easily made especially if the rule be a long one.

If the point to which measurement is made comes at the beginning or near the end of the rule then it can only be due to ignorance or carelessness that the rule is incorrectly held, yet even under such circumstances a measurement is often taken from the wrong end of the rule, but when the point of measurement comes near the center of the rule with the numerical discrepancy between the correct and incorrect holding so small, as said before, then the most careful measurer is oftentimes liable to be deceived. More over, this often happens with those who are accustomed to take measurements. They become somewhat careless. They reckon in their minds for a given distance how much the measurement should be. They may think, for example, that a given distance is 18 inches. In point of fact it is 17 inches by correct measurement. Inadvertently they measure from the wrong end of the rule. Glancing at the number nearest the point of measurement they note 19 inches and think that such must be the correct measurement without noting that a mistake has been made. This very fact shows the utility of my invention, not only for the ignorant and careless in giving them a designating mark or symbol which indicates whether they are holding or not holding their rule correctly, but also for assisting the careful measurer in order that he by glancing merely at the number nearest towards the point of measurement may determine at a glance whether or not he is or is not holding his rule in the correct way.

Figure 2:
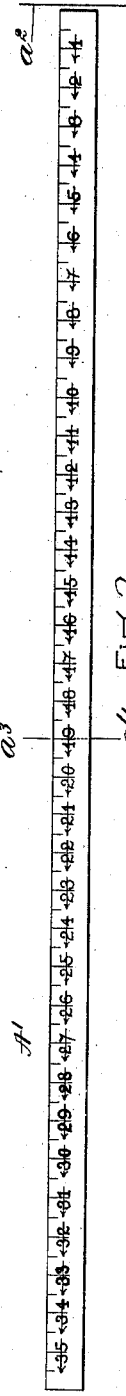
Figure 3:
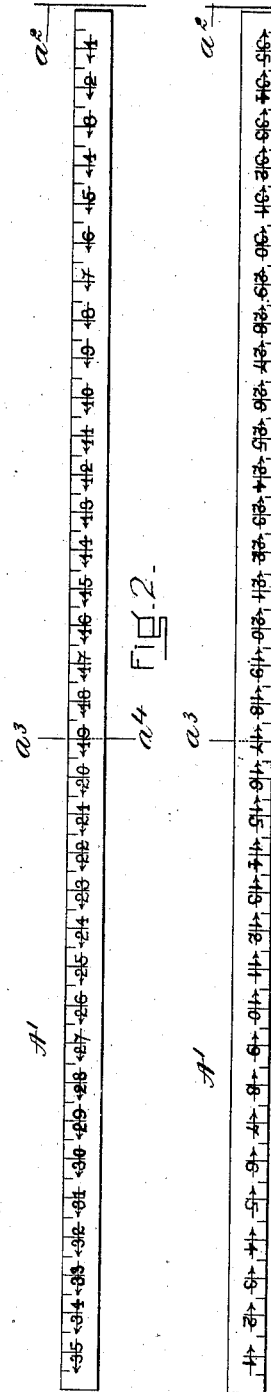
Figure 4:
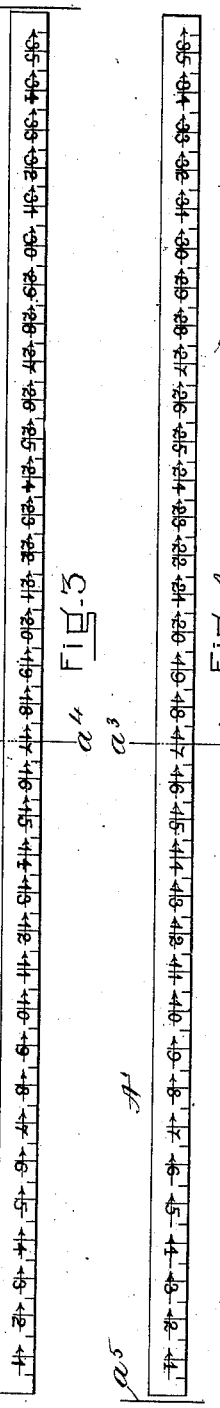
Figure 5:
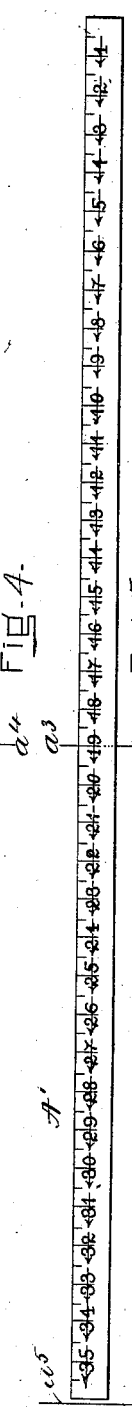

A series of indicating characters or arrows are also especially good when used with rules scaled on two sides as is the case with many of those in common use. In such case in measuring from the right one side of the rule would read as shown in Fig. 2 and the other side with the rule simply turned over would read as shown in Fig. 3, while in measuring from the left the reading would be as shown in Fig. 4, and with the rule turned over as shown in Fig. 5 so that simply as the rule is turned on one side or the other it is held right or wrong in taking a measurement from a given point and consequently a wrong reading taken as before explained. Moreover, the very fact of using two scales would lead to confusion, but with a pointing symbol or arrow indicating a proper holding of the rule relatively to the point of measurement there could be no confusion for one could tell merely by a glance whether the rule was held right whether measurement was taken from one side or the other.

In so far as the symbols or designating characters are concerned they may be of any desired form as before explained, but I much prefer to use an arrow or similar character in the nature of an arrow for the following reasons: As I have already stated, when some measurements are taken a proper holding of the rule would necessitate reading the numbers of the scale upside down and consequently the indicating character associated or combined with the numbers would appear inverted, unless they looked the same even when inverted. Now a pointing hand does not have this characteristic, but an arrow does as shown in Fig. 3 where in order to take a correct measurement from the left the numbers of the scale are read upside down, but the arrows combined with them appear to show no inversion.

While I have described my invention as applied to a common rule or measuring stick, it is equally applicable to a rule of any kind and especially so to a folding or jointed rule, so-called, or one having two or more sliding parts.

Having thus fully described my invention, I claim and desire to secure by Letters Patent of the United States:—

1. A measuring rule having along the same a series of symbols, each symbol being in itself indicative of direction, all of which symbols are without variation in their indication of direction and any one of which is adapted to suggest by its indication of direction the end of the rule from which a measurement is taken in measuring from a given point, substantially as and for the purposes set forth.

2. A measuring rule having a scale consisting of a series of progressive characters and a series of symbols associated therewith, each symbol being in itself indicative of direction, all of which symbols are without variation in their indication of direction and any one of which is adapted to suggest by its indication of direction the end of the rule from which a measurement is taken in measuring from a given point, substantially as and for the purposes set forth.

IRVIN BESSE.

Witnesses:
 JOHN E. R. HAYES,
 J. M. DOLON.